United States Patent
Yu et al.

(10) Patent No.: US 10,972,038 B2
(45) Date of Patent: Apr. 6, 2021

(54) STEPLESS MOTOR DRIVING CIRCUIT AND ASSOCIATED DRIVING METHOD

(71) Applicant: Xiamen Kiwi Instruments Corporation, Xiamen (CN)

(72) Inventors: Huijie Yu, Xiamen (CN); Ganfu Li, Zhuhai (CN); Zhuoyuan Zhou, Zhuhai (CN); Shuguang Wang, Xiamen (CN)

(73) Assignee: XIAMEN KIWI INSTRUMENTS CORPORATION, Xiamen (CN)

( * ) Notice: Subject to any disclaimer, the term of this patent is extended or adjusted under 35 U.S.C. 154(b) by 0 days.

(21) Appl. No.: 16/563,249

(22) Filed: Sep. 6, 2019

(65) Prior Publication Data

US 2020/0036317 A1    Jan. 30, 2020

(30) Foreign Application Priority Data

Dec. 19, 2018    (CN) .......................... 201811566584.3

(51) Int. Cl.
*H02P 27/08*    (2006.01)
*H02P 23/00*    (2016.01)

(52) U.S. Cl.
CPC .......... *H02P 27/08* (2013.01); *H02P 23/0004* (2013.01)

(58) Field of Classification Search
CPC ........ H02P 27/08; H02P 23/0004; H02P 1/00; H02P 1/04; H02P 1/46; H02P 3/00; H02P 21/00; H02P 23/00; H02P 25/00; H02P 27/00; H02P 27/04; H02P 27/06; G05B 11/28
USPC .... 318/400.01, 400.02, 400.14, 400.15, 700, 318/701, 721, 727, 799, 800, 801, 811, 318/599, 430, 432
See application file for complete search history.

(56) References Cited

U.S. PATENT DOCUMENTS 7,710,747 B2 *    5/2010    Matsumoto ........... H02M 5/458
                                                            363/35
9,673,732 B2 *    6/2017    Deboy .................... H02M 7/49
10,090,777 B2 *   10/2018   Dent ........................ H02J 3/32

FOREIGN PATENT DOCUMENTS

| CN | 101707471 A | 5/2010 |
| CN | 203071864 U | 7/2013 |
| CN | 10325946 A | 8/2013 |
| CN | 106026729 A | 10/2016 |
| CN | 206878731 U | 1/2018 |

(Continued)

OTHER PUBLICATIONS

International search report issued for counterpart Chinese patent application No. PCT/CN2019/104700 dated Dec. 2, 2019.

(Continued)

*Primary Examiner* — Antony M Paul
(74) *Attorney, Agent, or Firm* — Loza & Loza, LLP; Michael F. Fedrick

(57) ABSTRACT

A stepless motor driving circuit provides a sinusoidal shaped chopping signal for driving a motor. The driving circuit has: a switch circuit having an input which receives a rectified signal rectified from a sinusoidal AC signal and having a first output and a second output where the motor is coupled between; a synchronizing signal generating circuit which generates a synchronizing signal relating to the sinusoidal AC signal; and a switch driving circuit which selects and chops at least one switch in the switch circuit according to the synchronizing signal, and to form the sinusoidal shaped chopping signal which is corresponding to the sinusoidal AC signal.

21 Claims, 6 Drawing Sheets

(56) References Cited

FOREIGN PATENT DOCUMENTS

| CN | 107769667 | | 3/2018 |
|----|-----------|---|--------|
| CN | 109217775 | | 1/2019 |
| CN | 109217775 A | * | 1/2019 |
| EP | 3258588 A1 | | 12/2017 |

OTHER PUBLICATIONS

Lu Hong-Liang et al., "Development of Single Phase Induction Motor Drive and Control Strategy," Power Supply Technologies and Application, vol. 7 No. 5, pp. 303-307.

Mustafa Murat Bilgic, et al., "PWM AC chopper control of single-phase induction motor for variable-speed fan application," 34th Annual Conference of IEEE Industrial Electronics, Nov. 2008, pp. 1337-1342.

STMicroelectronics; Website [online]. STEVAL-IHM006V1—AC/AC chopper driver, Jul. 2007, 5 pages. https://www.mouser.com/datasheet/2/389/stmicroelectronics_cd00166609-1205940.pdf.

* cited by examiner

STEPLESS MOTOR DRIVING CIRCUIT AND ASSOCIATED DRIVING METHOD

CROSS-REFERENCE TO RELATED APPLICATIONS

This application claims priority to and the benefit of Chinese Patent Applications No. 201811566584.3, filed on Dec. 19, 2018, which is incorporated herein by reference in its entirety.

TECHNICAL FIELD

The present invention relates generally to electronic circuit, and more particularly but not exclusively relates to stepless motor driving circuit and the associated driving method.

BACKGROUND

Single-phase asynchronous motor is a type of motor supplied by single-phase mains AC (alternating current) power. Since mains AC power is easy for obtaining, single-phase motors are widely used not only for industrial usage but also for civil daily life usage. The required quantity of single-phase motors increases rapidly especially with the developing civil life quality.

SUMMARY

In one embodiment, a stepless motor driving circuit comprises a switch circuit, having an input, a ground end, a first output and a second output, the input of the switch circuit configured to receive a rectified signal, wherein the rectified signal is rectified from a sinusoidal AC signal, the motor coupled between the first output and the second output; a synchronizing signal generating circuit, configured to generate a synchronizing signal relating to the sinusoidal AC signal, wherein the synchronizing signal is in a first state at a first half cycle period of the sinusoidal AC signal and is in a second state at a second half cycle period of the sinusoidal AC signal; and a switch driving circuit configured to select and chop at least one switch in the switch circuit at a second frequency in each state of the synchronizing signal according to the synchronizing signal, and to form a sinusoidal shaped chopping signal between the first output and the second output, wherein the outline of the sinusoidal shaped chopping signal is corresponding to the sinusoidal AC signal.

In another embodiment, a stepless motor driving method comprises: inputting a sinusoidal AC signal, or a rectified signal rectified from a sinusoidal AC signal, into an input of a switch circuit; selecting and chopping at least one switch in the switch circuit by PWM signal, and to provide a sinusoidal shaped chopping signal at output of the switch circuit, wherein the outline of the sinusoidal shaped chopping signal is corresponding to the sinusoidal AC signal; and driving the motor by the sinusoidal shaped chopping signal, and regulating the rotation rate of the motor by adjusting the duty cycle of the PWM signal.

In yet another embodiment, a motor driving circuit for driving a motor comprises: a switch circuit, having an input, a first output and a second output, the input of the switch circuit is coupled to a sinusoidal AC signal or a rectified signal rectified from a sinusoidal AC signal, the motor coupled between the first output and the second output; and a switch driving circuit configured to selectively chop at least one switch in the switch circuit at a second frequency, and to form a sinusoidal shaped chopping signal between the first output and the second output, wherein the outline of the sinusoidal shaped chopping signal is corresponding to the sinusoidal AC signal, and wherein the second frequency is higher than the frequency of the sinusoidal AC signal.

BRIEF DESCRIPTION OF THE DRAWINGS

Non-limiting and non-exhaustive embodiments are described with reference to the following drawings. The drawings are only for illustration purpose. Usually, the drawings only show part of the devices of the embodiments.

Same numeral or label in different figures illustrates same or similar component or circuit.

DETAILED DESCRIPTION

Figure 1:
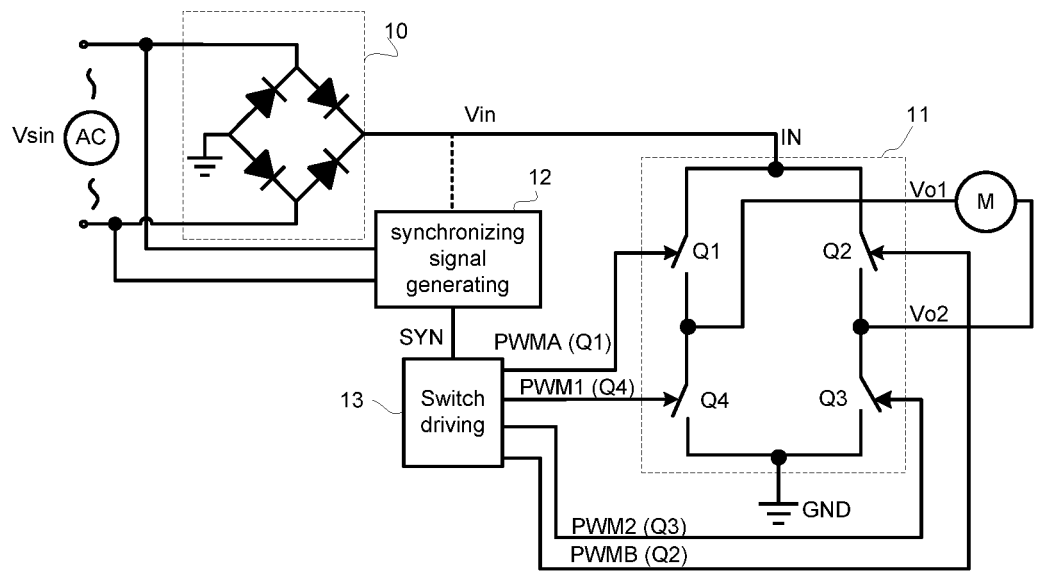
FIG. 1 illustrates a stepless motor driving circuit according to an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Throughout the specification and claims, the term "couple" as used herein, is defined as either directly, or indirectly connecting one to another via intermediary such as via electrical conducting materials which may have resistance, parasitic inductance or capacitance, or via other material(s) or component(s) as would be known to person skilled in the art without departure from the spirit and scope of the invention as defined by the appended claims.

A single-phase motor regulates its rotation rate by a motor driving circuit. One type of motor driving circuit adopts inductor to regulate rotation rate. By adjusting the inductance of a serially coupled inductor at several taps, the inductance ratio between the auxiliary winding and the main winding of the driving circuit is adjusted and thus the rotation rate is adjusted. However, this driving approach has limited steps of rotation rate, and cannot start or regulate at low rotation rate.

Another type of motor driving circuit adopts serially coupled electrical reactor. This approach can fulfill stepless rotation rate regulation. However, the regulating range is also limited, the size of an electrical reactor is too big, and the efficiency is low.

A third type of motor driving circuit adopts a bidirectional thyristor to regulate the rotation rate. This approach has wide usage for its low cost and simple structure. However, at low rotation rate, the voltage has high distortion, thus the power factor is low and may not meet the PF requirement of mains AC power. Further, this approach has high torque ripple and high noise.

A fourth type of possible motor driving method adopts AC chopper, several electrically isolated auxiliary power sources, and many high voltage devices, for example, 8 high voltage diodes and 2 high voltage bidirectional switches which connect to separate grounds. And further the high voltage devices require to be electrically isolated from the control circuit. Accordingly, this approach is difficult to be integrated with high complexity and high cost.

Yet another type of motor driving circuit may adopt frequency conversion inverter to regulate the rotation rate. This approach requires an AC-DC (alternating current to direct current) converter for rectifying and filtering an AC power into a constant DC power and a frequency conversion inverter for chopping a square waveform. Though this approach may regulate the width and frequency simultaneously, it requires large capacitor after a rectifying and filtering circuit or requires an AC-DC switching circuit to obtain a constant DC power, and further requires complex frequency conversion inverter to provide a variable-frequency-AC voltage source. Accordingly, this approach has large size, high cost and complex system control. Also, the power factor is low due to the existence of large capacitor. For example, the half load power factor is usually between 0.5 to 0.6. Thus, additional PFC (power factor correction) circuit is required which further adds on cost and power loss.

Accordingly, improved stepless motor driving circuit and driving method is required to address one or more deficiencies in the above approaches.

FIG. 1 illustrates a stepless motor driving circuit for driving a motor M according to an embodiment of the present invention. The stepless motor driving circuit comprises a rectifying circuit 10, a switch circuit 11, a synchronizing signal generating circuit 12 and a switch driving circuit 13. In a preferred embodiment, the motor comprises a single-phase asynchronous motor. Of course, motor M may comprise other type of motor. The rectifying circuit 10 converts a sinusoidal AC signal Vsin into a rectified signal Vin. In a preferred embodiment, the sinusoidal AC signal Vsin is directly from the commercial mains AC power, having a power frequency such as 50 hertz. In an embodiment, a stepless motor driving circuit does not comprise an internal rectifying circuit, but comprise an external rectifying circuit. In an embodiment, a rectifying circuit for converting a sinusoidal AC signal into a rectified signal may be deemed as part of the switching circuit.

Switch circuit 11 has an input IN, a ground end GND, a first output Vo1 and a second output Vo2. The input IN of the switch circuit 11 receives the rectified signal Vin. The motor M is coupled between the first output Vo1 and the second output Vo2. The ground end GND is coupled to a reference ground. Wherein the rectified signal Vin is full-wave rectified from a sinusoidal AC signal Vsin.

The switch circuit 11 comprises a first switch Q1, a second switch Q2, a third switch Q3 and a fourth switch Q4. The first switch Q1 is coupled between the input Vin and the first output Vo1. The second switch Q2 is coupled between the input Vin and the second output Vo2. The third switch Q3 is coupled between the second output Vo2 and the ground end GND, and the fourth switch Q4 is coupled between the first output Vo1 and the ground end GND. The switch circuit 11 with above configuration can be called an H-bridge switch circuit. In other embodiments, the switch circuit 11 may have a different configuration or further comprise other components such as serially or parallelly coupled switch/switches, conductors, resistors, etc.

The synchronizing signal generating circuit 12 is used to generate a synchronizing signal SYN according to the sinusoidal AC signal Vsin, or according to the rectified signal Vin. In each approach, the synchronizing signal SYN is generated relating to the sinusoidal AC signal Vsin. In one embodiment, with reference to FIG. 2, the synchronizing signal SYN has a first state S1 having a first voltage level, such as HIGH voltage level as shown and a second state S2 having a second voltage level which is different from the first voltage level, such as LOW voltage level. The first state S1 and the second state S2 are alternating, wherein a cycle period of a first state S1 is corresponding to a cycle period of the rectified signal Vin, and a cycle period of a second state S2 is corresponding to another adjacent cycle period of the rectified signal Vin. And the states of the synchronizing signal SYN repeat.

At a first half cycle period of the sinusoidal AC signal Vsin when the voltage of sinusoidal AC signal Vsin is higher than zero or named ground voltage at the ground end, the synchronizing signal SYN is in the first state S1, such as HIGH level. And at a second half cycle period of the sinusoidal AC signal Vsin when the voltage of sinusoidal AC signal Vsin is less than ground voltage, the synchronizing signal SYN is in the second state S2, such as LOW level which is different from the first state S1.

In an embodiment, the synchronizing signal generating circuit 12 generates the synchronizing signal SYN according to the sinusoidal AC signal Vsin. In a preferred embodiment, the synchronizing signal SYN is generated according to the mains AC power, and the frequency of the synchronizing signal SYN is the same as the frequency of mains AC power, such as 50 hertz, and the synchronizing signal SYN is in HIGH voltage level at a first half cycle period of the mains AC power and is in LOW voltage level at a second half cycle period of the mains AC power.

Figure 2:
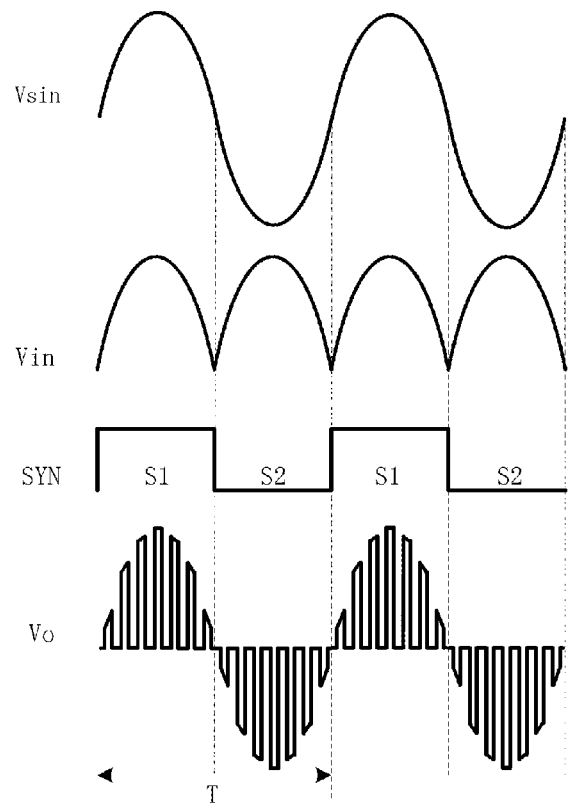
FIG. 2 illustrates a signal waveform diagram of signals with reference to the circuit in FIG. 1 according to an embodiment of the present invention.

In another embodiment, the synchronizing signal SYN is generated according to the rectified signal Vin. Referring to FIG. 2, the synchronizing signal SYN is in a first state S1

(HIGH voltage level) when is corresponding to the odd number cycles of the rectified signal Vin, and is in a second state S2 (LOW voltage level) when is corresponding to the even number cycles of the rectified signal Vin.

Figure 4:
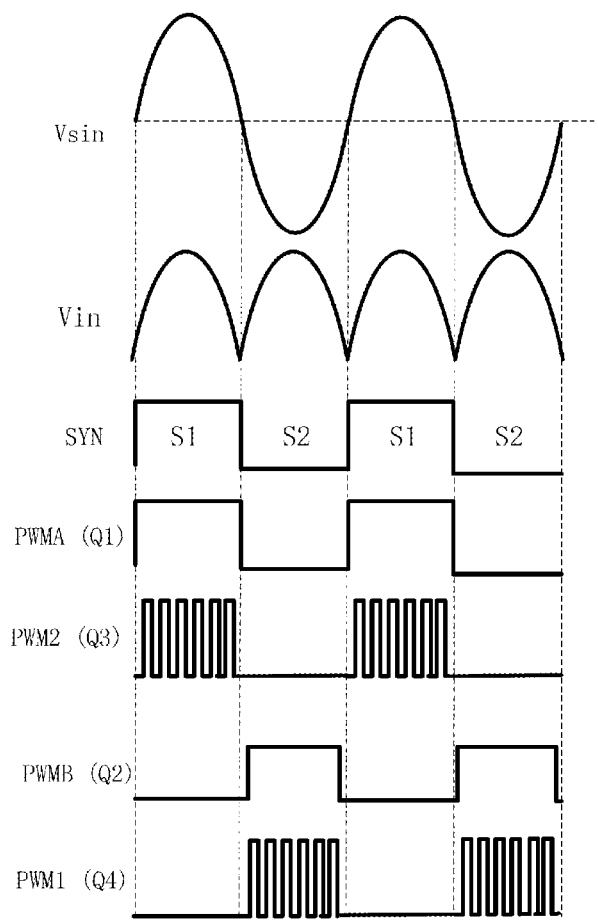
FIG. 4 illustrates a signal waveform diagram of signals with reference to the circuit in FIG. 3 according to an embodiment of stepless motor driving method of the present invention.

The switch driving circuit 13 provides several driving signals PWMA, PWMB, PWM2 and PWM1 to drive the first switch Q1, the second switch Q2, the third switch Q3 and the fourth switch Q4 in the switch circuit 11 respectively. Wherein some of the driving signals PWMA, PWMB, PWM2 and PWM1 may be in the same signal form and two of the switches may be driven by one signal. In one embodiment, by controlling the states of the driving signals, the switch driving circuit 13 selects and chop according to the state of the synchronizing signal SYN, at least one switch from the first switch Q1, the second switch Q2, the third switch Q3 and the fourth switch Q4 in each state of the synchronizing signal SYN at a second frequency, in order to form a sinusoidal shaped PWM (pulse width modulation) signal Vo between the first output Vo1 and the second output Vo2, where the voltage of the sinusoidal shaped chopping signal Vo can be represented as: Vo=Vo1−Vo2, wherein in equation Vo1 represents the voltage at the first output Vo1 and Vo2 represents the voltage at the second output Vo2. The outline of the sinusoidal shaped chopping signal Vo is corresponding to the sinusoidal AC signal Vsin. That is, the shape of the outline 81 of the sinusoidal shaped chopping signal Vo is the same or similar with the shape of the sinusoidal AC signal Vsin with reference with FIG. 8. From FIG. 8, it can be seen that the outline 81 of the sinusoidal shaped chopping signal Vo also has a corresponding or the same frequency with that of the sinusoidal AC signal Vsin, for example 50 hertz. In a preferred embodiment, the outline 81 of the sinusoidal shaped chopping signal Vo is a sinusoidal signal having a frequency of mains power. In a preferred embodiment, the switch driving circuit 13 adopts a PWM signal having a second frequency to chop at least one switch from the switch circuit 11, and accordingly the chopping frequency of the sinusoidal shaped chopping signal Vo is the second frequency. In one embodiment, the second frequency is 10 times higher than the frequency of the sinusoidal AC signal Vsin. The rotation rate of the motor is steplessly regulated by adjusting the duty cycle of the PWM signal. And the effective value Voe of the output voltage Vo is: Voe=Vine*Duty, where Vine is the effective value of the input voltage Vin, and Duty is the duty cycle of the PWM signal. The effective value Voe determines the rotation rate of the motor M. In an embodiment referring to FIG. 4, at a first half cycle period of the sinusoidal AC signal Vsin, the synchronizing signal SYN is in a first state S1, and the switch driving circuit 13 chops the third switch Q3 by PWM signal at a second frequency; and at a second half cycle period of the sinusoidal AC signal Vsin, the synchronizing signal SYN is in a second state S2, and the switch driving circuit 13 chops the fourth switch Q4 at a second frequency, in order to form a sinusoidal shaped chopping signal between the first output Vo1 and the second output Vo2 of the switch circuit 11. Accordingly, as shown in FIG. 4, in each state (either state S1 or state S2) of the synchronizing signal SYN, one switch is selected to be chopped by PWM signal at the second frequency, in order to form the sinusoidal shaped chopping signal Vo as shown in FIG. 2.

Figure 5:
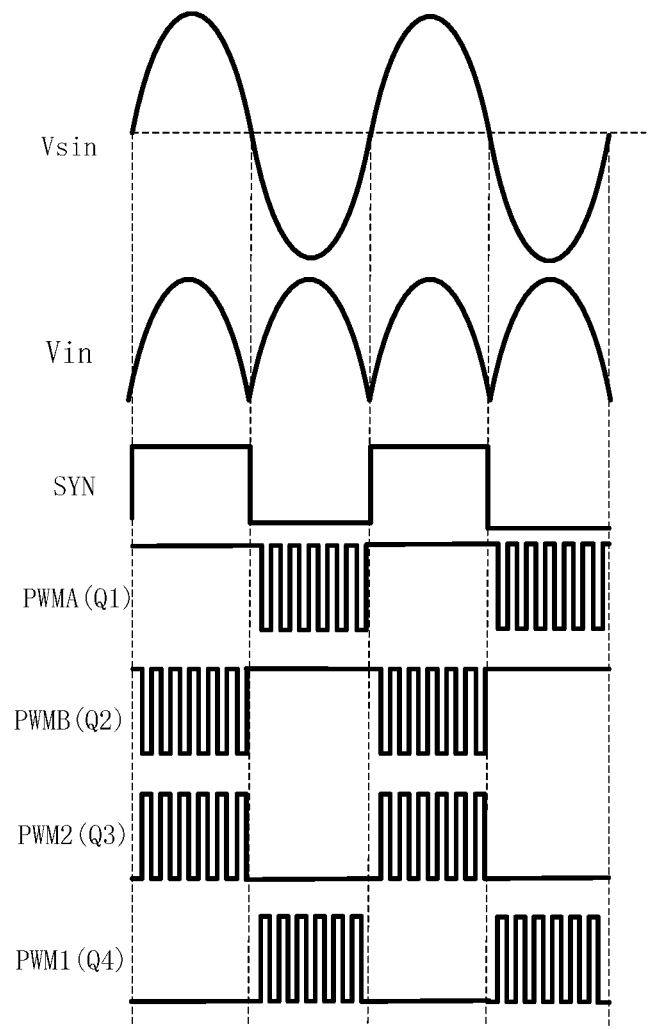
FIG. 5 illustrates a signal waveform diagram of signals with reference to the circuit in FIG. 3 according to another embodiment of stepless motor driving method of the present invention.

In an embodiment referring to FIG. 5, when the synchronizing signal SYN is in a first state S1, the switch driving circuit 13 chops the second switch Q2 and the third switch Q3 by PWM signals at a second frequency, wherein the PWM signal for chopping the second switch Q2 and the PWM signal for chopping the third switch Q3 are in reverse phase; and when the synchronizing signal SYN is in a second state S2, the switch driving circuit 13 chops the first switch Q1 and the fourth switch Q4 at the second frequency wherein the first switch Q1 and the fourth switch Q4 are chopped in reverse phase, in order to form a sinusoidal shaped chopping signal between the first output Vo1 and the second output Vo2. Accordingly, as shown in FIG. 5, in each state (either state S1 or state S2) of the synchronizing signal SYN, two switches are selected to be chopped by PWM signals at the second frequency, in order to form the sinusoidal shaped chopping signal Vo as shown in FIG. 2.

FIG. 2 illustrates a signal waveform diagram of signals with reference to the circuit in FIG. 1 according to an embodiment of the present invention. The sinusoidal shaped chopping signal generated between the first output Vo1 and the second output Vo2 of the switch circuit 11, which is the differential value of the voltage at the first output Vo1 and the voltage at the second output Vo2 is represented as sinusoidal shaped chopping signal Vo shown in FIG. 2. The outline of the sinusoidal shaped chopping signal Vo is corresponding to the sinusoidal AC signal Vsin, preferably, having a sine wave shape. Preferably, the PWM chopping frequency, or called the second frequency is 10 times higher than the frequency of the sinusoidal AC signal Vsin. In one embodiment, the second frequency may be a variable frequency.

In one embodiment, the rectified signal Vin is rectified from a mains AC power signal, and the cycle period T of the sinusoidal shaped chopping signal Vo equals the cycle period of the mains AC power. Where the frequency of the rectified signal Vin is 2 times the frequency of the mains AC power.

By driving the single-phase motor by the sinusoidal shaped chopping signal Vo, the rotation rate of the single-phase motor can be regulated by adjusting the duty cycle of the sinusoidal shaped chopping signal Vo. Further, since the outline waveform shape of the sinusoidal shaped chopping signal Vo is highly similar to the waveform shape of the mains AC power signal, the waveform shape of the input current at the AC input of the stepless motor driving system is also highly corresponding to the waveform shape of the mains AC power voltage, thus the power factor (PF) of the stepless motor driving system is very high.

Figure 3:
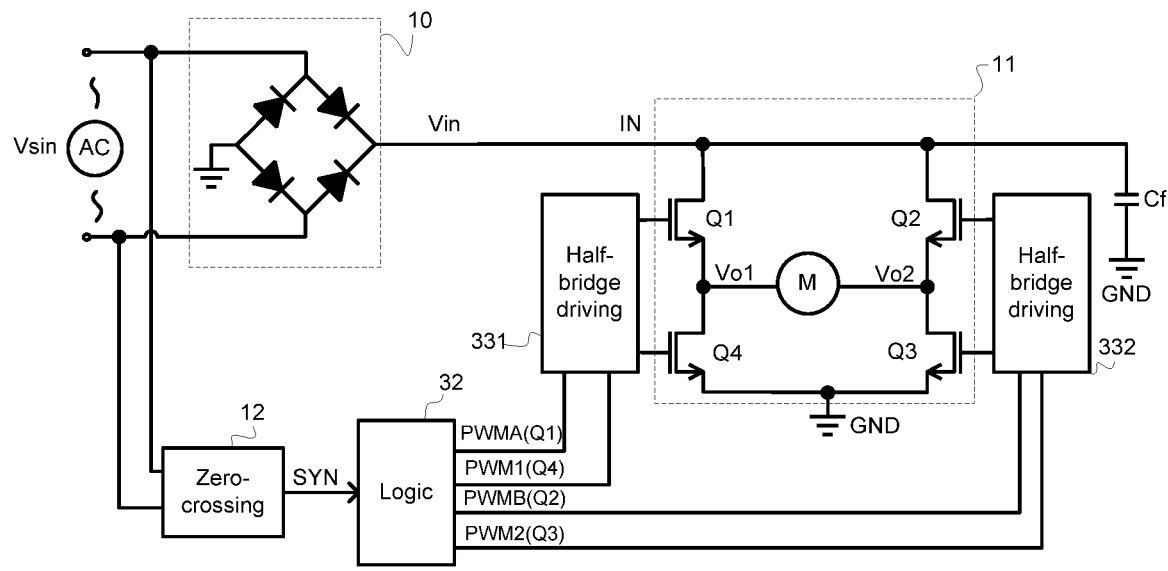
FIG. 3 illustrates a stepless motor driving circuit for single-phase motor according to an embodiment of the present invention.

FIG. 3 illustrates a stepless motor driving circuit for driving single-phase motor according to an embodiment of the present invention. The stepless motor driving circuit comprises a rectifying circuit 10, a switch circuit 11, a synchronizing signal generating circuit 12 and a switch driving circuit. The rectifying circuit 10 converts a sinusoidal AC signal Vsin into a rectified signal Vin. Preferably, the sinusoidal AC signal Vsin is directly obtained from the mains AC power. A person skilled in the art would know that the voltage waveform shape of the mains AC power may not be in a standard sine waveform and may have distortions because of the electro-magnetic interference and so on.

Figure 7:
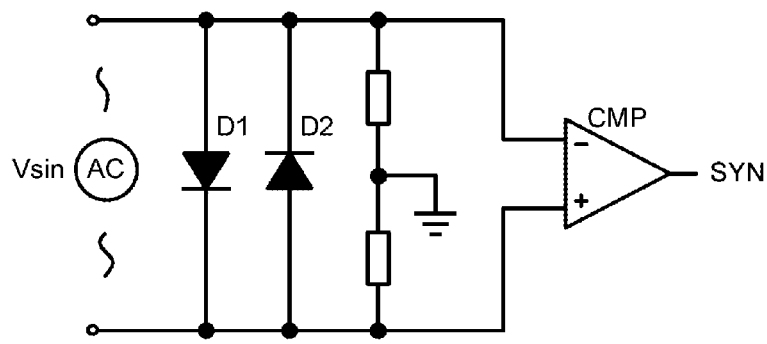
FIG. 7 illustrates a synchronizing signal generating circuit according to an embodiment of the present invention.

The synchronizing signal generating circuit 12 generates a synchronizing signal SYN according to the sinusoidal AC signal Vsin. The synchronizing signal generating circuit 12 may comprise a zero-crossing detecting circuit, and when the sinusoidal AC signal Vsin crosses zero voltage, the state of the synchronizing signal SYN reverses. FIG. 7 illustrates a synchronizing signal generating circuit according to an embodiment of the present invention. With reference to FIG. 4 and FIG. 7, when the sinusoidal AC signal Vsin is higher than zero, the synchronizing signal SYN is in a first state (HIGH level), and when the sinusoidal AC signal Vsin is lower than zero, the synchronizing signal SYN is in a second state S2 (LOW level) which is different from the first state S1. Or in other words, the synchronizing signal SYN is in a first state S1 at a first half cycle period of the sinusoidal AC signal Vsin and is in a second state S2 at a second half cycle period of the sinusoidal AC signal Vsin.

Continuing with FIG. 3, the switch driving circuit comprises a logic circuit 32, a first half-bridge driving circuit 331 and a second half-bridge driving circuit 332. The switch driving circuit chops at least one switch from switches Q1-Q4 to perform switching action at a second frequency by PWM signal in each state of the synchronizing signal SYN periodically, for example, chop a first switch Q1 in each first state S1 of the synchronizing signal SYN and chop a third switch Q3 in each second state S2 of the synchronizing signal SYN. The logic circuit 32 generates four logic signals PWMA, PWM1, PWMB and PWM2 according to the synchronizing signal SYN for driving the switches Q1-Q4 respectively. Specifically, the logic circuit 32 has an input and four outputs, wherein the input of the logic circuit 32 is coupled to the output of the synchronizing signal generating circuit 12 to receive the synchronizing signal SYN. The four outputs of the logic circuit 32 provides four driving signals PWMA, PWM1, PWMB and PWM2 respectively. In an embodiment, referring to FIG. 4, the signal PWMA provided by the first output of the logic circuit 32 is synchronized with the synchronizing signal SYN, and thus the control signal of the first switch Q1 synchronizes with the synchronizing signal SYN. Signal PWMB provided by the third output of the logic circuit 32 is in reverse phase with the synchronizing signal SYN, and thus the control signal at the control end of the second switch Q2 is in reverse phase with the synchronizing signal SYN. Signal PWM1 provided by the second output of the logic circuit 32 is an AND signal by performing AND operation of the signal PWMB provided at the third output of the logic circuit 32 and a PWM signal, and thus the control signal for controlling the fourth switch Q4 is an AND signal between signal PWMB and a PWM signal. Signal PWM2 provided at the fourth output of the logic circuit 32 is an AND signal by performing AND operation of the signal PWMA at the first output of the logic circuit and a PWM signal, or the control signal for controlling the third switch Q3 is an AND signal between the control signal for controlling the first switch Q1 and a PWM signal. In another embodiment, with reference to FIG. 5, the first output signal PWMA of the logic circuit 32 is an OR signal by performing OR operation of the synchronizing signal SYN and a PWM signal, the third output signal PWMB is an OR signal by performing OR operation of an reversed synchronizing signal which is in reverse phase with the synchronizing signal SYN and a PWM signal. The second output signal PWM1 is a reversed signal of signal PWMA provided at the first output of the logic circuit. And the fourth output signal PWM2 is a reversed signal of signal PWMB provided at the third output of the logic circuit. In one embodiment, each of the driving signals PWMA, PWM1, PWMB and PWM2 comprises dead times in order to eliminate mistakenly turning on switches simultaneously.

The driving stage circuit comprises the first half-bridge driving circuit 331 and the second half-bridge driving circuit 332. The first half-bridge driving circuit 331 has two inputs and two outputs, wherein the two inputs of the first half-bridge driving circuit 331 are coupled to a first output and a second output of the logic circuit 32 to receive signals PWMA and PWM1 respectively. The two outputs of the first half-bridge driving circuit 331 are coupled to the control end of the first switch Q1, and the control end of the fourth switch Q4 and to control the ON and OFF states of switches Q1 and Q4 respectively. Specifically, the first driving signal PWMA drives the first switch Q1 and the second driving signal PWM1 drives the fourth switch Q4.

The second half-bridge driving circuit 332 has two inputs and two outputs, wherein the two inputs of the second half-bridge driving circuit 332 are coupled to third output and a fourth output of the logic circuit 32 to receive signals PWMB and PWM2 respectively. The two outputs of the second half-bridge driving circuit 332 are coupled to the control end of the second switch Q2 and the control end of the third switch Q3, and to control the ON and OFF states of switches Q2 and Q3 respectively. Specifically, the third driving signal PWMB drives the second switch Q2 and the fourth driving signal PWM2 drives the third switch Q3.

In other embodiments, the switch driving circuit may have different topologies and structures. In one embodiment, the logic circuit has two outputs for providing two signals PWMA and PWMB as shown in FIG. 5, or for providing two signals PWM1 and PWM2 as shown in FIG. 5, and through amplification by the driving stage circuit, the two signals are amplified to drive four switches, wherein switches Q1 and Q4 have opposite doping types and controlled by signal PWMA or PWM1, and Q2 and Q3 have opposite doping types and controlled by signal PWMB or PWM2. The opposite doping types make the two switches switch in opposite states. In one embodiment, the driving stage circuit receives two signals outputted by the logic circuit and provides four driving signals as shown in FIG. 5 for controlling switches Q1-Q4. In another embodiment, the logic circuit may have three outputs and provide three signals as PWMA, PWM1 and PWM2 as shown in FIG. 4, and drive switches Q1 and Q2 by the amplified signal of PWMA, drive switch Q3 by the amplified signal of PWM2 and drive switch Q4 by the amplified signal of PWM1, where switches Q1 and Q2 have opposite doping types. Or in another embodiment, the driving stage circuit provides four driving signals for driving switches Q1, Q2, Q3 and Q4 with the same doping type. In one embodiment, the logic circuit provides four logic signals PWMA, PWMB, PWM1 and PWM2, and the driving stage circuit comprises a full-bridge driving circuit configured to receive the four logic signals and provide four driving signals for controlling switches Q1, Q2, Q3 and Q4 respectively.

In one embodiment as shown in FIG. 3, each of the switches Q1, Q2, Q3 and Q4 comprises a MOSFET (Metal-Oxide-Semiconductor Field-Effect Transistor), wherein the drains of the first switch Q1 and the second switch Q2 are coupled to the input IN, the source of the first switch Q1 is coupled to the first output Vo1, the source of the second switch Q2 is coupled to the second output Vo2; the sources of the third switch Q3 and the fourth switch Q4 are coupled to the ground end GND, the drain of the third switch Q3 is coupled to the second output Vo2, and the drain of the fourth switch Q4 is coupled to the first output Vo1. In other embodiments, each of the switch Q1, Q2, Q3 or Q4 may comprise other types of power transistor, for example, a JFET (Junction Field-Effect Transistor), or a BJT (Bipolar Junction Transistor). In one embodiment, each of the switches Q1, Q2, Q3 and Q4 comprises a BJT, wherein the collectors of the first switch Q1 and the second switch Q2 are coupled to the input IN, the emitter of the first switch Q1 is coupled to the first output Vo1, and the emitter of the second switch Q2 is coupled to the second output Vo2; the emitters of the third switch Q3 and the fourth switch Q4 are coupled to the ground end GND, the collector of the third switch Q3 is coupled to the second output Vo2, and the collector of the fourth switch Q4 is coupled to the first output Vo1. When each of the switches Q1, Q2, Q3 and Q4 comprises a BJT, a diode may be parallelly coupled between the emitter and the collector of each switch, to provide a freewheeling current path. In one embodiment, switches Q1 and Q2 each comprises a first type of power transistor and switches Q3 and Q4 each comprises another type of power transistor.

In the embodiment as shown in FIG. 3, parasitic diode exists between the source and the drain of each switch, and when switch Q1 or Q2 turns OFF, current would flow through its parasitic diode. Accordingly, the single-phase stepless motor driving circuit further comprises a capacitor Cf, coupled between the input IN and the ground end GND of the switch circuit 11, in order to provide freewheeling current path for the parasitic diodes of the switches Q1 and Q2 when switch Q1 or Q2 is in OFF state for eliminating possible sudden changes of the voltage between the first output Vo1 and the second output Vo2. Since capacitor Cf is used to provide freewheeling current path, there is no need to adopt a large capacitor with high capacitance value, instead, a small capacitor is adopted. In one embodiment, capacitor Cf comprises a thin-film capacitor. Accordingly, large capacitor such as electrolytic capacitor or additional AC-DC converter which are adopted for obtaining constant DC power is eliminated, thus system size and cost are greatly reduced. In one embodiment, the capacitance of capacitor Cf is about 0.47 μF (microfarad). In one embodiment, the capacitance of capacitor Cf is about 0.33 μF. In one embodiment, besides the equivalent capacitance of the switch circuit 11, that is taking no account of the equivalent capacitance of the switch circuit 11 such as the parasitic capacitance or equivalent capacitance during switching, for example when remove the switch circuit 11 away, the effective capacitance between the input IN and the ground GND is less than 1 μF. In an embodiment considering the extreme condition, besides the equivalent capacitance of the switch circuit 11, the effective capacitance between the input IN and the ground end GND is less than 4.7 μF, which is far less than the capacitance of the electrolytic capacitor adopted in the comparison approach which usually has hundreds or tens of microfarad.

By adopting the configuration as shown in FIG. 4, the switch circuit 11, the synchronizing signal generating circuit 12, the logic circuit 32 and the switch driving circuit (331,332) can be integrated on a same semiconductor substrate without complexity.

FIG. 4 illustrates a signal waveform diagram of signals with reference to the circuit in FIG. 3 according to an embodiment of stepless motor driving method of the present invention. The signals represent the sinusoidal AC signal Vsin, the rectified signal Vin, the synchronizing signal SYN, switch driving signal PWMA for driving the first switch Q1, switch driving signal PWM2 for driving the third switch Q3, switch driving signal PWMB for driving the second switch Q2, and switch driving signal PWM1 for driving the fourth switch Q4. The rectified signal Vin is rectified from the sinusoidal AC signal Vsin. The states of the synchronizing signal SYN is relating to the rectified signal Vin or the sinusoidal AC signal Vsin. Where at a first half cycle period of the sinusoidal AC signal Vsin, the synchronizing signal SYN is in HIGH level, and at a second half cycle period of the sinusoidal AC signal Vsin, the synchronizing signal SYN is in LOW level. Of course, the HIGH level and LOW level of the synchronizing signal SYN can be exchanged.

At a first half cycle period of the sinusoidal AC signal Vsin, the synchronizing signal SYN is in the first state S1 (HIGH level), driving signal PWMA is in HIGH level, driving signal PWM2 comprises PWM signal with higher frequency, driving signal PWMB and PWM1 are in LOW level. Accordingly, the switch driving circuit turns on the first switch Q1, chops the third switch Q3 at a second frequency, and turns off the second switch Q2 and the fourth switch Q4.

At a second half cycle period of the sinusoidal AC signal Vsin, the synchronizing signal SYN is in the second state S2 (LOW level), driving signal PWMB is in HIGH level, driving signal PWM1 comprises PWM signal with higher frequency, driving signal PWMA and PWM2 are in LOW level. Accordingly, the switch driving circuit turns on the second switch Q2, chops the fourth switch Q4 at a second frequency, and turns off the first switch Q1 and the third switch Q3. In one embodiment, the frequency of the PWM signal or called the second frequency is 10 times higher than the frequency of the sinusoidal AC signal Vsin. From the diagram, it can be seen that the first driving signal PWMA for driving the first switch Q1 of the switch circuit is synchronized with the synchronizing signal SYN, the outline of the chopping signal PWM2 has a similar shape with the synchronizing signal SYN. Signal PWMB is in reversed phase with signal PWMA, and the outline of the chopping signal PWM1 has a similar shape with signal PWMB. In one embodiment, each pulse in the chopping signals fully turns on the corresponding switch.

FIG. 5 illustrates a signal waveform diagram of signals with reference to the circuit in FIG. 3 according to another embodiment of stepless motor driving method of the present invention. The signals represent the sinusoidal AC signal Vsin, the rectified signal Vin, the synchronizing signal SYN, switch driving signal PWMA for driving the first switch Q1, switch driving signal PWMB for driving the first switch Q2, switch driving signal PWM2 for driving the third switch Q3, and switch driving signal PWM1 for driving the fourth switch Q4. The rectified signal Vin is rectified from the sinusoidal AC signal Vsin.

At a first half cycle period of the sinusoidal AC signal Vsin, the synchronizing signal SYN is in the first state S1 (HIGH level), driving signal PWMA for driving switch Q1 is in HIGH level, driving signal PWMB for driving switch Q2 comprises PWM signal, driving signal PWM2 for driving switch Q3 comprise PWM signal which is in reverse phase with signal PWMB, and driving signal PWM1 for driving switch Q4 is in LOW level. Accordingly, the switch driving circuit turns on the first switch Q1, turns off the fourth switch Q4, and chop the second switch Q2 and third switch Q3 with reverse phases at a second frequency. That is, switches Q2 and Q3 are turned OFF and ON with a frequency (second frequency) higher than the rectified signal Vin. During this period, when switch Q2 is turned ON, switch Q3 is turned OFF, and when switch Q2 is turned OFF, switch Q3 is turned ON.

At a second half cycle period of the sinusoidal AC signal Vsin, the synchronizing signal SYN is in the second state S2 (LOW level), driving signal PWMA for driving switch Q1 is PWM signal, driving signal PWMB for driving switch Q2 is in HIGH level, driving signal PWM2 for driving switch Q3 is in LOW level and driving signal PWM1 for driving switch Q4 is PWM signal which is in reverse phase with signal PWMA. Accordingly, the switch driving circuit turns on the second switch Q2, turns off the third switch Q3, and chop the first switch Q1 and fourth switch Q4 with reverse phases. That is, switches Q1 and Q4 are turned OFF and ON with second frequency, and when switch Q1 is turned ON, switch Q4 is turned OFF, and vice versa. In one embodiment, the second frequency is 10 times higher than the frequency of the sinusoidal AC signal Vsin.

In the embodiments as shown in FIG. 3, FIG. 4 and FIG. 5, at least one switch from switches Q1, Q2, Q3 and Q4 are selected and chopped according to the synchronizing signal to perform switching action at a second frequency, in order to form a sinusoidal shaped chopping signal Vo between the first output Vo1 and the second output Vo2. For embodiment shown in FIG. 4, when the synchronizing signal SYN is in the first state S1, switch Q3 is selected to be chopped to perform switching action at second frequency, and when the synchronizing signal SYN is in the second state S2, switch Q4 is selected to be chopped to perform switching action at second frequency, in order to form a sinusoidal shaped chopping signal Vo between the first output Vo1 and the second output Vo2. For embodiment shown in FIG. 5, when the synchronizing signal SYN is in the first state S1 (HIGH level), switches Q2 and Q3 are selected and chopped to perform switching action with reversed phases at second frequency, and when the synchronizing signal SYN is in the second state S2 (LOW LEVEL), switches Q1 and Q4 are selected and chopped to perform switching action with reversed phases at second frequency, in order to form a sinusoidal shaped chopping signal Vo between the first output Vo1 and the second output Vo2.

In the embodiments as shown in FIG. 4 and FIG. 5, besides selecting and chopping at least one switch to perform switching action at a second frequency which is higher than that of the sinusoidal AC signal, the motor driving circuit further simultaneously turns on at least one switch and turns off at least one switch at each state of the synchronizing signal SYN, to form a sinusoidal shaped chopping signal Vo between the first output Vo1 and the second output Vo2. For example, in FIG. 4, at the first state S1 of the synchronizing signal SYN, besides chopping switch Q3 at second frequency, switch Q1 is turned ON and switches Q2 and Q4 are turned OFF; and at the second state S2 of signal SYN, besides chopping switch Q4 at second frequency, switch Q2 is turned ON and switches Q1 and Q3 are turned OFF. In FIG. 5, at the first state S1 of the synchronizing signal SYN, besides chopping switches Q2 and Q3 at second frequency, switch Q1 is turned ON and switch Q4 is turned OFF; and at the second state S2 of signal SYN, besides chopping switches Q1 and Q4 at second frequency, switch Q2 is turned ON, and switch Q3 is turned OFF.

In the embodiments with reference to FIG. 3, FIG. 4 and FIG. 5, stepless motor driving circuit generates a sinusoidal shaped chopping signal Vo as shown in FIG. 2 between the first output Vo1 and the second output Vo2 of the switch circuit, where Vo=Vo1−Vo2. And referring to FIG. 8, the sinusoidal shaped chopping signal Vo is corresponding to the sinusoidal AC signal Vsin, that is the outline waveform shape of the sinusoidal shaped chopping signal Vo synchronizes with the shape of the sinusoidal AC signal Vsin, both of which have the same frequency and similar waveform shape. In one embodiment, each pulse of the PWM signal is fully presented.

Figure 6:
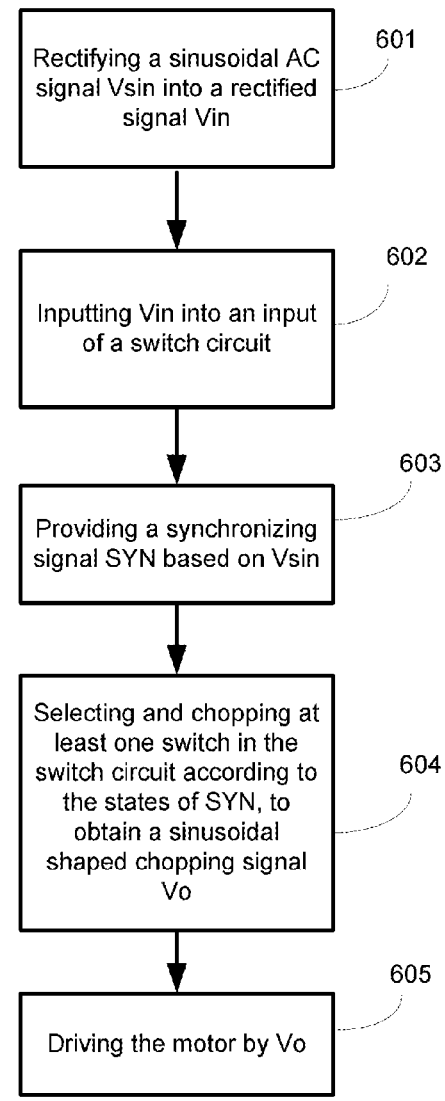
FIG. 6 illustrates a block diagram of stepless motor driving method according to an embodiment of the present invention.

FIG. 6 illustrates a block diagram of stepless motor driving method according to an embodiment of the present invention. The motor driving method comprises steps 601-605. At step 601, the method comprises rectifying a sinusoidal AC signal Vsin into a rectified signal Vin. In a preferred embodiment, sinusoidal AC signal Vsin is the voltage signal direct from mains AC power.

At step 602, the method comprises inputting the rectified signal Vin into an input of a switch circuit. Typically, the switch circuit comprises an H-bridge having a circuit configuration as shown as the switch circuit 11 shown in FIG. 1. In other embodiments, the switch circuit may have a different structure from the switch circuit 11 or comprise additional components. The rectifying circuit may be considered as part of the switch circuit because the diodes or switches in the rectifying circuit perform switching actions. Thus, to combine step 601 and step 602 in one step, the method comprises inputting a sinusoidal AC signal Vsin into an input of a switch circuit.

At step 603, the method comprises providing a synchronizing signal SYN based on the sinusoidal AC signal Vsin or based on the rectified signal Vin, wherein at a first half cycle period of the sinusoidal AC signal Vsin, the synchronizing signal SYN is at a first state, such as in HIGH level, and at a second half cycle period of the sinusoidal AC signal, the synchronizing signal SYN is at a second state, such as in LOW level. In one embodiment, synchronizing signal SYN is generated by detecting the zero-crossing of sinusoidal AC signal Vsin, and when the zero-crossing point is detected, the state of synchronizing signal SYN changes. In another embodiment, synchronizing signal SYN is generated according to the rectified signal Vin, and at the end of each cycle of the rectified signal Vin, the synchronizing signal SYN changes the state, and accordingly at each odd number cycle of the rectified signal Vin, synchronizing signal SYN is in the first state and at each even number cycle of the rectified signal Vin, synchronizing signal SYN is in the second state.

At step 604, the method comprises selecting and chopping at least one switch in the switch circuit to perform switching action by PWM signal at a second frequency according to the synchronizing signal SYN, at each state of the synchronizing signal, and to provide a sinusoidal shaped chopping signal Vo at the output of the switch circuit, wherein the outline of the sinusoidal shaped chopping signal is corresponding to the sinusoidal AC signal. In one embodiment with reference to FIG. 4, at this step 604, the method of selecting and chopping at least one switch in the switch circuit to perform switching action comprises: providing a first driving signal PWMA for driving a first switch Q1 of an H-bridge switch circuit with reference to FIG. 3, wherein the first driving signal PWMA is synchronized with the synchronizing signal SYN, both of which have similar shape; providing a second driving signal PWMB for driving a second switch Q2 of the H-bridge switch circuit, wherein the second driving signal PWMB is in reverse phase with the synchronizing signal SYN; performing AND operation of the first driving signal PWMA and a PWM signal to get a first chopping signal PWM2, the first chopping signal PWM2 has a higher frequency than the synchronizing signal SYN and is configured to drive the third switch Q3 of the H-bridge switch circuit; and performing AND operation of the second driving signal PWMB and a PWM signal to get a second chopping signal PWM1, the second chopping signal PWM1 configured to drive a fourth switch Q4 of the H-bridge switch circuit. In one embodiment, either the chopping frequency of the first chopping signal PWM2 or the chopping frequency of the second chopping signal PWM1 is 10 times higher than the power frequency of sinusoidal AC signal Vsin. In another embodiment, with reference to FIG. 5, the method of selecting and chopping at least one switch in the switch circuit to perform switching action comprises: performing OR operation of the synchronizing signal SYN and a PWM signal to get a first chopping signal PWMA, the first chopping signal PWMA configured to drive a first switch Q1 of an H-bridge switch circuit with reference to FIG. 3; reversing the synchronizing signal SYN to get a reversed synchronizing signal, and performing OR operation of the reversed synchronizing signal and a PWM signal to get a second chopping signal PWMB, the second chopping signal PWMB configured to drive a second switch Q2 of the H-bridge switch circuit; reversing the second chopping signal PWMB to get a third chopping signal PWM2, the third chopping signal PWM2 configured to drive a third switch Q3 of the H-bridge switch circuit; and reversing the first chopping signal PWMA to get a fourth chopping signal PWM1, the fourth chopping signal PWM1 configured to drive a fourth switch Q4 of the H-bridge switch circuit.

At step 605, the method further comprises driving the motor by the sinusoidal shaped chopping signal Vo, and regulating the rotation rate of the motor by adjusting the duty cycle of the PWM signal which is used to form the chopping signals.

FIG. 7 illustrates a synchronizing signal generating circuit according to an embodiment of the present invention. The synchronizing signal generating circuit comprises two parallelly coupled rectifying diodes D1 and D2 with opposite directions coupled to two terminals of the sinusoidal AC input, two resistors having the same resistance and a comparing circuit CMP. Wherein diodes D1 and D2 rectify the input sinusoidal AC signal Vsin. The two serially coupled resistors are coupled to the sinusoidal AC input and have a common node coupled to the ground. The comparing circuit CMP has two inputs coupled to the two inputs of the sinusoidal AC signal Vin and is biased by a stable power supply referring to the ground. The output of the comparing circuit CMP is adopted to provide a synchronizing signal SYN as shown in FIG. 2, and when the sinusoidal AC signal Vsin is higher than zero voltage (voltage at the ground), synchronizing signal SYN is in HIGH level, and when the sinusoidal AC signal Vsin is lower than zero voltage, synchronizing signal SYN is in LOW level.

Figure 8:
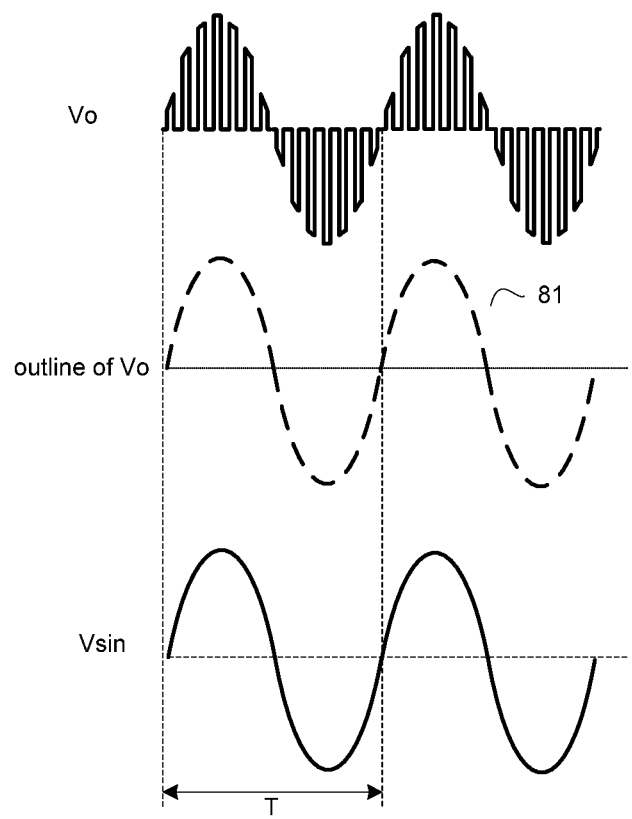
FIG. 8 illustrates a signal waveform diagram accordingly to an embodiment of the present invention.

FIG. 8 illustrates a signal waveform diagram showing the sinusoidal shaped chopping signal Vo, the outline 81 of signal Vo, and the sinusoidal AC signal Vsin, accordingly to an embodiment of the present invention. The waveform shape of the outline 81 of signal Vo is synchronized with the sinusoidal AC signal Vsin, that is the outline 81 of signal Vo and the sinusoidal AC signal Vsin have the same cycle period and similar shape. At a first half cycle period of the sinusoidal AC signal Vsin, the sinusoidal AC signal Vsin is higher than zero, and the outline 81 is also a first half semi sine wave. At a second half cycle period of the sinusoidal AC signal Vsin, the sinusoidal AC signal Vsin is lower than zero, and the outline 81 is also a second half semi sine wave.

Figure 9:
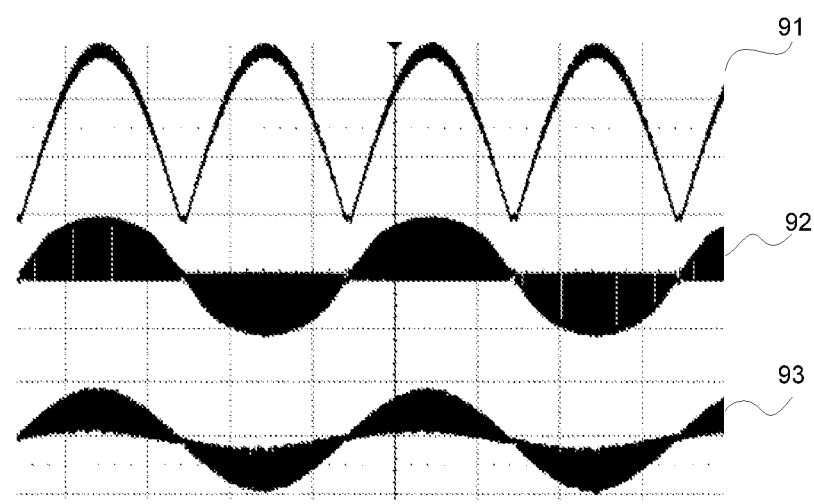
FIG. 9 illustrates a test waveform diagram of a prototype device according to an embodiment of the present invention.

FIG. 9 illustrates a test waveform diagram of a prototype device according to an embodiment of the present invention. The first wave 91 shows the full-wave rectified signal Vin of sinusoidal AC signal Vsin of mains power. The second wave 92 shows the output voltage Vo (Vo=Vo1−Vo2) for driving the motor. The output voltage Vo is a sinusoidal shaped chopping signal Vo, the outline of which has the same frequency and similar shape with the sinusoidal AC signal at the system input. Accordingly, the input current would have a good consistency with the input voltage at the system AC input, and the system power factor would be high. The outline of the sinusoidal shaped chopping signal Vo in embodiments of the present invention is highly corresponding to the voltage signal of AC mains power, thus have high power factor.

From embodiments as described above, it can be seen that, a motor driving circuit comprises a switch circuit and a switch driving circuit, wherein the input of the switch circuit is coupled to a sinusoidal AC signal, and the motor coupled to the output namely between a first output and a second output of the switch circuit. And by the switch driving circuit selectively chopping at least one switch of the switch circuit at a higher frequency than that of the sinusoidal AC signal, the motor driving circuit forms a sinusoidal shaped chopping signal between the first output and the second output of the switch circuit for driving the motor. And stepless regulation can be achieved by adjusting the duty cycle of the sinusoidal shaped chopping signal. To be specific, for example, at a first half cycle period of the sinusoidal AC signal, by chopping switch Q3 (referring to FIG. 4), or chopping switches Q2 and Q3 (referring to FIG. 5), and at a second half cycle period of the sinusoidal AC signal, by chopping at least one switch in the rest switches of the switch circuit such as switch Q4 (referring to FIG. 4), or switches Q1 and Q4 (referring to FIG. 5), a sinusoidal shaped chopping signal Vo is formed at the output. In one embodiment, the output comprises two differential outputs Vo1 and Vo2 of the switch circuit as shown in FIG. 1 and FIG. 3. In multiple prototype tests, the half-road power ratio of the motor driving circuit is higher than 0.9. The half road is when the output current is about 50% of the full-load output current. In a preferred embodiment, the switch circuit comprises an H-bridge switch circuit as shown in FIG. 1 or FIG. 3. In an embodiment, the switch circuit further comprises a ground end and a rectifying circuit, where the input of the rectifying circuit is coupled to mains AC power source and the output of the rectifying circuit is coupled to the input of the H-bridge switch circuit.

Figure 10:
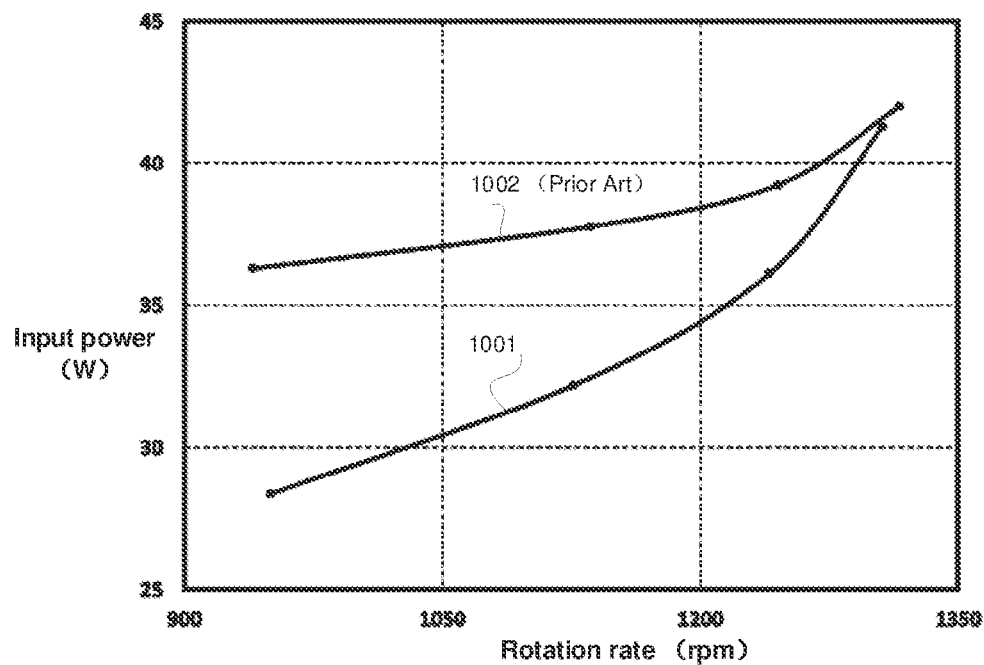
FIG. 10 illustrates a comparison testing diagram of input power in variation of rotation rate between a prototype device according to an embodiment of the present invention and a prior art device.

FIG. 10 illustrates a comparison testing diagram of input power in variation of rotation rate between a prototype motor driver device according to an embodiment of the present invention and a prior art commercial device of multi-tap motor driver. The horizontal ordinate represents the rotation rate rpm (rotation per minute), and the vertical ordinate represents the input power (Watt) at the AC mains power input. Curve 1001 represents the input power of the embodiment of the present application, and curve 1002 represents the input power of the prior art device. As shown in the figure, at the same rotation rate, the input power of the embodiment of the present application is much less than that in the prior art device, and thus has much higher efficiency, especially when rotation rate is low. In one test, efficiency can improve by 25% above in low rotation rate.

Figure 11:
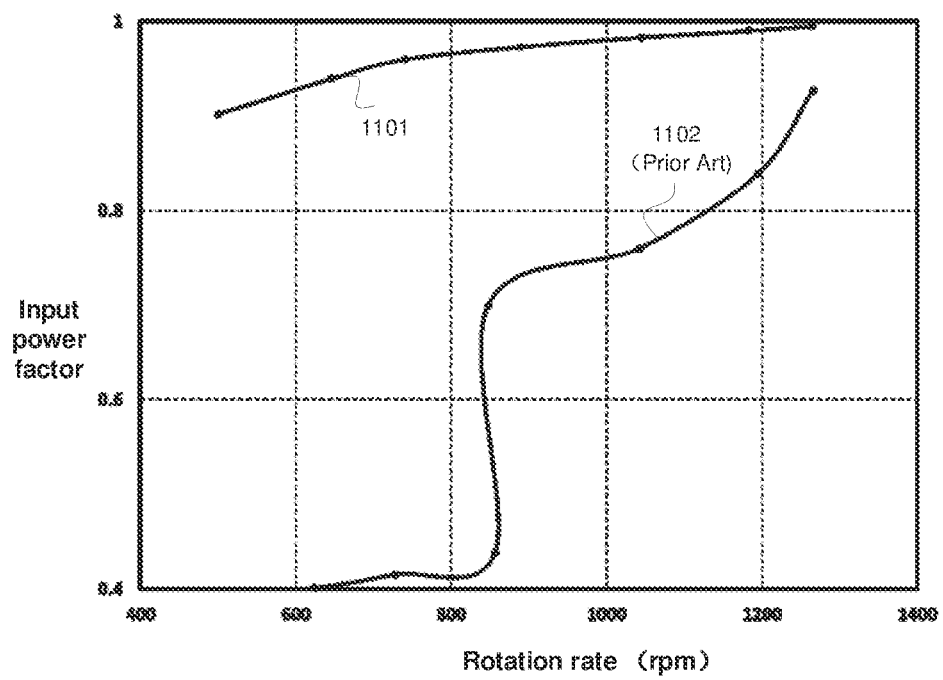
FIG. 11 illustrates a comparison testing diagram of input power factor in variation of rotation rate between a prototype device according to an embodiment of the present invention and a prior art device.

FIG. 11 illustrates a comparison testing diagram of input power factor in variation of rotation rate between a prototype device according to an embodiment of the present invention and a prior art commercial device with multi taps and adjusted capacitance. The horizontal ordinate represents the rotation rate rpm (rotation per minute), and the vertical ordinate represents the input power factor of the AC mains power. Curve 1101 represents the input power factor of the embodiment of the present application, and curve 1102 represents the input power factor of the prior art device. As shown in the figure, at the same rotation rate, the input power factor of the embodiment of the present application is much higher than that in the prior art device.

Motor driving circuits and methods according to embodiments of the present application have simple structure, yet can regulate the rotation rate of the motor steplessly and stably, and have high power ratio at the same time.

It will be appreciated by persons skilled in the art that the present invention is not limited to what has been particularly shown and described herein above. Rather the scope of the present invention is defined by the claims and includes both combinations and sub-combinations of the various features described herein above as well as variations and modifications thereof which would occur to persons skilled in the art upon reading the foregoing description and which are not in the prior art.

We claim:

1. A stepless motor driving circuit, comprising:
a switch circuit, having an input, a ground end, a first output and a second output, the input of the switch circuit configured to receive a rectified signal, wherein the rectified signal is rectified from a sinusoidal AC signal, the motor coupled between the first output and the second output;
a synchronizing signal generating circuit, configured to generate a synchronizing signal relating to the sinusoidal AC signal, wherein the synchronizing signal is in a first state at a first half cycle period of the sinusoidal AC signal and is in a second state at a second half cycle period of the sinusoidal AC signal; and
a switch driving circuit, configured to select and chop at least one switch in the switch circuit according to the synchronizing signal, at a second frequency different from frequency of the sinusoidal AC signal in each state of the synchronizing signal, and to form a sinusoidal shaped chopping signal between the first output and the second output, wherein the outline of the sinusoidal shaped chopping signal is corresponding to the sinusoidal AC signal.

2. The stepless motor driving circuit of claim 1, wherein the switch circuit comprising a first switch, a second switch, a third switch and a fourth switch, wherein the first switch is coupled between the input and the first output, the second switch is coupled between the input and the second output, the third switch is coupled between the second output and the ground end, and the fourth switch is coupled between the first output and the ground end.

3. The stepless motor driving circuit of claim 2, wherein when the synchronizing signal is in the first state, the switch driving circuit is configured to turn on the first switch, chop the third switch, and turn off the second switch and the fourth switch; and when the synchronizing signal is in the second state, the switch driving circuit is configured to turn on the second switch, chop the fourth switch, and turn off the first switch and the third switch.

4. The stepless motor driving circuit of claim 2, wherein when the synchronizing signal is in the first state, the switch driving circuit is configured to turn on the first switch, turn off the fourth switch, and chop the second switch and the third switch, wherein the second switch and the third switch are chopped in reverse phases; and when the synchronizing signal is in the second state, the switch driving circuit is configured to turn on the second switch, turn off the third switch, and chop the first switch and the fourth switch, wherein the first switch and the fourth switch are chopped in reverse phases.

5. The stepless motor driving circuit of claim 2, wherein each of the first switch, the second switch, the third switch and the fourth switch comprises a power transistor, and wherein the drains or the collectors of the first switch and the second switch are coupled to the input, the source or the emitter of the first switch is coupled to the first output, the source or the emitter of the second switch is coupled to the second output; the sources or the emitters of the third switch and the fourth switch are coupled to the ground end, the drain or the collector of the third switch is coupled to the second output, and the drain or the collector of the fourth switch is coupled to the first output.

6. The stepless motor driving circuit of claim 2, wherein the switch driving circuit comprises:
a logic circuit, having an input and at least two outputs, wherein the input of the logic circuit is coupled to the output of the synchronizing signal generating circuit; and
a driving state circuit, having at least two inputs and at least two outputs, wherein the at least two inputs of the driving stage circuit are coupled to the at least two outputs of the logic circuit respectively, and the at least two outputs of the driving state circuit are configured to control the first switch, the second switch, the third switch and the fourth switch.

7. The stepless motor driving circuit of claim 2, wherein the switch driving circuit comprises:
a logic circuit, having an input and four outputs, wherein the input of the logic circuit is coupled to the output of the synchronizing signal generating circuit;
a first half-bridge driving circuit, having two inputs and two outputs, wherein the two inputs of the first half-bridge driving circuit are coupled to a first output and a second output of the logic circuit respectively, and the two outputs of the first half-bridge driving circuit are coupled to control end of the first switch and control end of the fourth switch; and
a second half-bridge driving circuit, having two inputs and two outputs, wherein the two inputs of the second half-bridge driving circuit are coupled to a third output and a fourth output of the logic circuit respectively, and the two outputs of the second half-bridge driving circuit are coupled to control end of the second switch and control end of the third switch.

8. The stepless motor driving circuit of claim 2, wherein:
the signal at control end of the first switch is synchronized with the synchronizing signal;
the signal at control end of the second switch is in reverse phase with the synchronizing signal;
the signal at control end of the fourth switch is by performing AND operation of the signal at the control end of the second switch and a PWM (Pulse Width Modulation) signal having the second frequency; and
the signal at control end of the third switch is by performing AND operation of the signal at the control end of the first switch and a PWM signal having the second frequency.

9. The stepless motor driving circuit of claim 1, wherein the motor comprises a single-phase asynchronous motor.

10. The stepless motor driving circuit of claim 1, wherein in each state of the synchronizing signal, the switch driving circuit is configured to chop at least one switch, turn off at least one switch and turn on at least one switch from the switch circuit.

11. The stepless motor driving circuit of claim 1, wherein the switch driving circuit adopts PWM signal to chop the at least one switch at the second frequency, and the second frequency is 10 times higher than the frequency of the sinusoidal AC signal.

12. The stepless motor driving circuit of claim 1, further comprising a rectifying circuit, the rectifying circuit is configured to convert the sinusoidal AC signal into the rectified signal.

13. The stepless motor driving circuit of claim 1, wherein the synchronizing signal is generated according to the sinusoidal AC signal, and wherein when the sinusoidal AC signal is higher than ground voltage, the synchronizing signal is in the first state, and when the sinusoidal AC signal is lower than ground voltage, the synchronizing signal is in the second state.

14. The stepless motor driving circuit of claim 1, further comprising a capacitor coupled between the input and the ground end, and wherein the capacitance between the input and the ground end besides the equivalent capacitance of the switch circuit is less than 4.7 µF.

15. A stepless motor driving method, comprising:
inputting a sinusoidal AC signal, or a rectified signal rectified from a sinusoidal AC signal, into an input of a switch circuit;
selecting and chopping at least one switch in the switch circuit by PWM signal, and to provide a sinusoidal shaped chopping signal at output of the switch circuit, wherein the outline of the sinusoidal shaped chopping signal is corresponding to the sinusoidal AC signal; and
driving the motor by the sinusoidal shaped chopping signal, and regulating the rotation rate of the motor by adjusting the duty cycle of the PWM signal.

16. The stepless motor driving method of claim 15, further comprising providing a synchronizing signal relating to the sinusoidal AC signal, wherein at a first half cycle period of the sinusoidal AC signal, the synchronizing signal is in a first state, and at a second half cycle period of the sinusoidal AC signal, the synchronizing signal is in a second state; and wherein at least one switch is selected and chopped in each state of the synchronizing signal according to the synchronizing signal.

17. The stepless motor driving method of claim 16, wherein the switch circuit comprises an H-bridge switch circuit, and the method of selecting and chopping at least one switch in the switch circuit comprises:
providing a first driving signal for driving a first switch of the H-bridge switch circuit, wherein the first driving signal is synchronized with the synchronizing signal;
providing a second driving signal for driving a second switch of the H-bridge switch circuit, wherein the second driving signal is in reverse phase with the synchronizing signal;
performing AND operation of the first driving signal and a PWM signal to get a first chopping signal, the first chopping signal configured to drive a third switch of the H-bridge switch circuit; and
performing AND operation of the second driving signal and a PWM signal to get a second chopping signal, the second chopping signal configured to drive a fourth switch of the H-bridge switch circuit.

18. The stepless motor driving method of claim 16, wherein the switch circuit comprises an H-bridge switch circuit, and the method of selecting and chopping at least one switch in the switch circuit comprises:
performing OR operation of the synchronizing signal and a PWM signal to get a first chopping signal, the first chopping signal configured to drive a first switch of the H-bridge switch circuit;
reversing the synchronizing signal to get a reversed synchronizing signal;
performing OR operation of the reversed synchronizing signal and a PWM signal to get a second chopping signal, the second chopping signal configured to drive a second switch of the H-bridge switch circuit;
reversing the second chopping signal to get a third chopping signal, the third chopping signal configured to drive a third switch of the H-bridge switch circuit; and
reversing the first chopping signal to get a fourth chopping signal, the fourth chopping signal configured to drive a fourth switch of the H-bridge switch circuit.

19. A motor driving circuit for driving a motor, comprising:
a switch circuit, having an input, a first output and a second output, the input of the switch circuit is coupled to a sinusoidal AC signal or a rectified signal rectified from a sinusoidal AC signal, the motor coupled between the first output and the second output; and
a switch driving circuit, configured to selectively chop at least one switch in the switch circuit at a second frequency, and to form a sinusoidal shaped chopping signal between the first output and the second output, wherein the outline of the sinusoidal shaped chopping signal is corresponding to the sinusoidal AC signal, and wherein the second frequency is higher than the frequency of the sinusoidal AC signal.

20. The motor driving circuit of claim 19, wherein a half-road power ratio of the motor driving circuit is higher than 0.9.

21. The motor driving circuit of claim 19, wherein the switch circuit comprises a rectifying circuit and an H-bridge switch circuit, wherein the rectifying circuit has two inputs coupled to two terminals of mains power source and has two outputs coupled an input of the H-bridge switch circuit and a ground end respectively.

* * * * *